(12) United States Patent
Ase et al.

(10) Patent No.: US 6,225,584 B1
(45) Date of Patent: May 1, 2001

(54) AUDIO OPERATING DEVICE

(75) Inventors: Yukimi Ase; Yoji Kanaoka; Koichi Shimamura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,222

(22) Filed: Dec. 3, 1999

(30) Foreign Application Priority Data

Dec. 4, 1998 (JP) .................................................. 10-345178

(51) Int. Cl.$^7$ ....................................................... H01H 9/06
(52) U.S. Cl. ..................................... 200/61.54; 200/61.85
(58) Field of Search ..................................... 200/17 R, 18, 200/5 R, 61.27, 61.3, 61.54, 61.57, 52 R, 61.85, 61.87, 61.88, 61.28, 293, 293.1, 294, 296

(56) References Cited

U.S. PATENT DOCUMENTS

| | | | |
|---|---|---|---|
| 4,455,463 | * | 6/1984 | Rohl ................................. 200/61.85 |
| 4,508,944 | * | 4/1985 | Yahima et al. .................... 200/61.85 |
| 4,518,836 | * | 5/1985 | Wooldridge ........................ 200/61.54 |
| 4,565,909 | * | 1/1986 | Yahima et al. .................... 200/61.85 |
| 4,701,629 | * | 10/1987 | Citroen ............................... 307/10 R |
| 4,710,599 | * | 12/1987 | Motodate et al. ................. 200/61.85 |
| 5,949,149 | * | 9/1999 | Shitanaka et al. .................. 307/10.1 |

FOREIGN PATENT DOCUMENTS 3-40183   4/1991   (JP) .................................. B62J/6/00

* cited by examiner

*Primary Examiner*—Michael Friedhofer
(74) *Attorney, Agent, or Firm*—Birch, Stewart, Kolasch & Birch, LLP

(57) ABSTRACT

An audio operating device provided on a handlebar of a motorcycle. The device includes a first operating plane which is tilted outwardly from the longitudinal axis of the vehicle, which contains audio switches which are generally operated most frequently. The switches on the first operating plane are accessible by a rider's left hand while holding the left handle grip. The left side of the device includes a talk knob and a power switch. The second operating plane, and a right side of the device, include switches which are less frequently used, and are accessible by the rider's right hand.

13 Claims, 9 Drawing Sheets

AUDIO OPERATING DEVICE

BACKGROUND OF THE INVENTION

1. Field of the Invention

The present invention relates to an audio operating device, and particularly to an audio operating device mounted on a motorcycle.

2. Background Art

While audio equipment mounted in four-wheel vehicles is well-known, audio equipment has recently been mounted on large-sized motorcycles. Some motorcycles so equipped have been configured such that the most commonly used audio switches are mounted on a handlebar adjacent to a handle grip. FIG. 12 of the present application is a perspective view of a handlebar portion of a motorcycle on which conventional audio equipment is mounted.

Referring to FIG. 12, a switch unit 2 containing switches for operating a main body of the motorcycle is provided on a handlebar at a position adjacent to a handle grip 1, and an audio switch unit 3 for operating the audio equipment is additionally provided on the switch unit 2. A horn switch 201, a blinker switch 202, a hazard switch 203, and a high-beam/low-beam selecting switch 204 are provided on the switch unit 2. A choke lever 205 is provided on the handlebar at a position adjacent to the vehicular center side of the switch unit 2.

A music selection switch 301 and a mute switch 302 are provided on the audio switch unit 3. To allow a rider holding the handle grip 1 to easily operate the music selection switch 301 and the mute switch 302 with his thumb, the audio switch unit 3 is configured such that the operating plane thereof is tilted on the left side, that is, the handle grip 1 side. This configuration has been disclosed in Japanese Utility Model Laid-open No. Hei 340183.

The above-described audio switch unit, however, has the following problem. As described above, the music selection switch 301 and the mute switch 302 are provided on the audio switch unit 3; however, it is required to provide a number of switches other than the switches 301 and 302 to operate the audio equipment. Such switches are provided, for example, on an operating box disposed on a fuel tank.

Some motorcyclists do not like the layout in which an operating box is disposed on the fuel tank because such a layout detracts from the appearance of the motorcycle. To improve the appearance of the motorcycle, it may be considered to dispose a main box of the operating box at another location, for example, under the seat and collect switches to an audio switch unit provided on the handle portion.

However, the switch mounting plane of the audio switch unit must be extended in order to contain a large number of switches. In this case, it is difficult for a rider holding a handle grip to operate all of the switches with his fingers. This may result in error in operating the switches.

Also, the arrangement of a large number of switches on a single switch mounting plane presents a complex arrangement to the rider, and it may be difficult to distinguish among the switches during use.

It would therefore be desirable to provide a comprehensive audio operating device which does not detract from the appearance of the motorcycle.

It would also be desirable to provide an audio operating device in which a rider can accurately operate the audio switches during use.

SUMMARY OF THE INVENTION

The present invention achieves the above objects and other advantages not contemplated by the conventional art.

According to a first feature of the present invention, an audio operating device is provided on a handlebar of a motorcycle at a position adjacent to a handle grip. The device includes at least two operating planes opposed to a rider, the first operating plane being provided on a left handle grip side and tilted at a predetermined angle with respect to the axis of the left handle grip, towards a rider's hand holding the left handle grip. The second operating plane is adjacent to the first operating plane and is tilted towards the central portion of a vehicular body at a predetermined angle with respect to the first operating plane. The first and second operating planes are formed into a body which projects towards the rider.

According to the first feature, since the audio operating device has first and second operating planes, a large number of switches can be arranged on the audio operating device. In particular, since the first operating plane is tilted to the axis of the handle grip at a predetermined angle, it is easy for a rider to operate switches arranged on the first operating plane with his left hand. Because the second operating plane is tilted towards the center of the vehicle, it is easy for the rider to operate switches arranged on the second operating plane with his right hand.

According to a second feature of the present invention, of a plurality of operating switches, the switches which are less frequently used are arranged on the second operating plane. These switches may include switches necessary for initial setting of the audio operating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
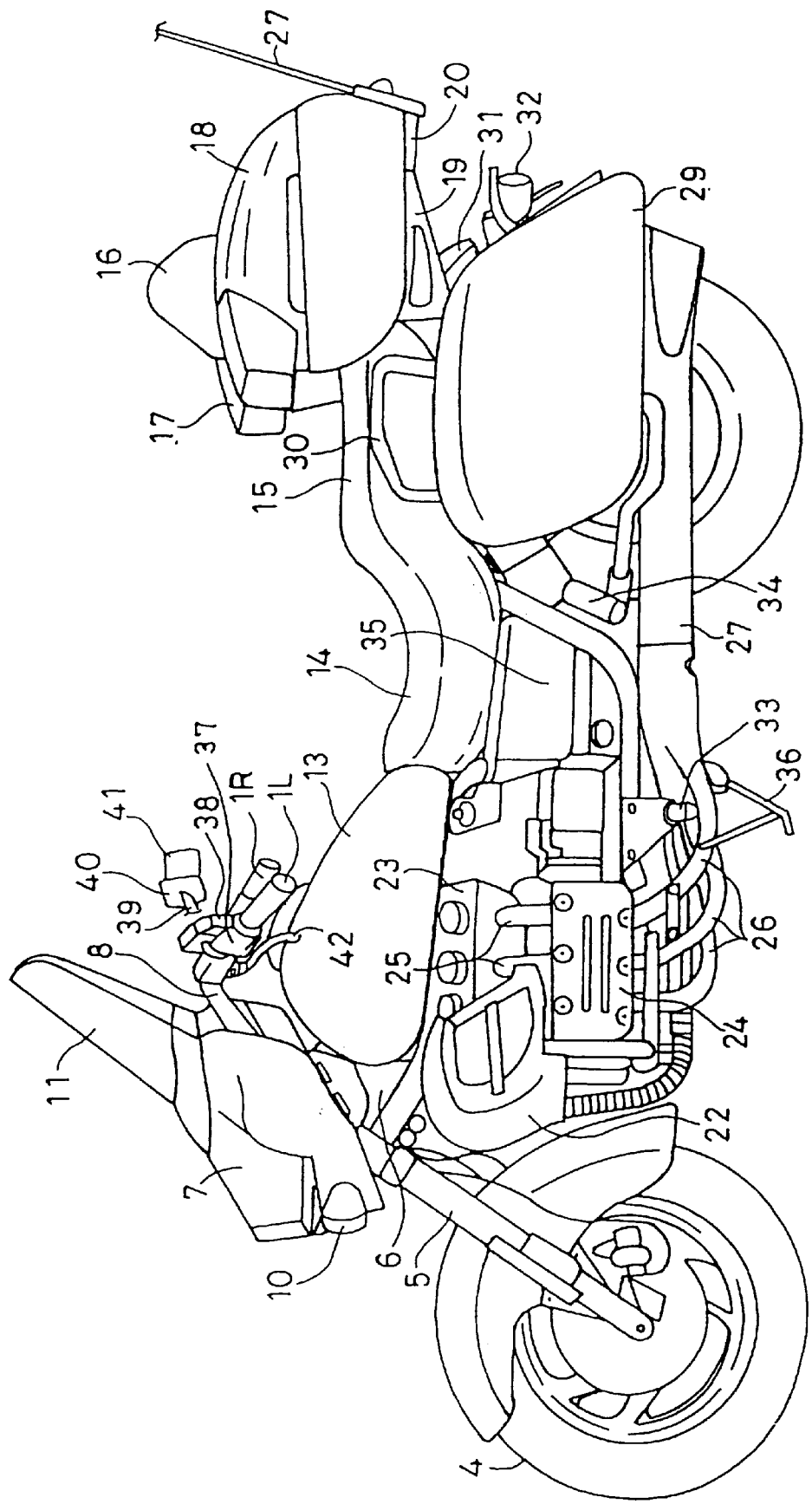
FIG. 1 is a side view of a motorcycle on which an audio operating device according to an embodiment of the present invention is mounted.

Hereinafter, the present invention will be described with reference to the drawings. It should be noted that, in the following description, like or similar parts are designated by like reference numerals.

Figure 2:
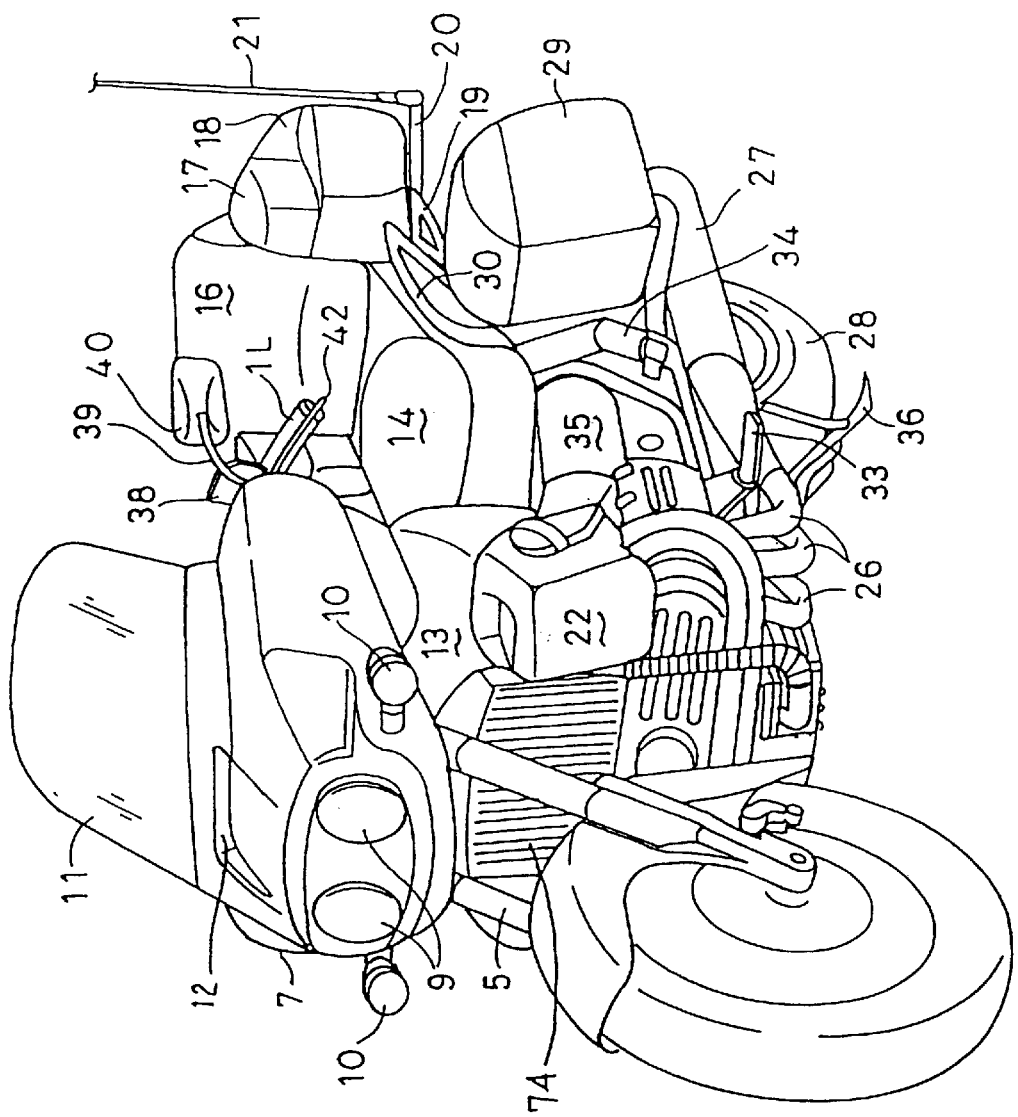
FIG. 2 is a perspective view of the motorcycle of FIG. 6.

FIG. 1 is a side view of a motorcycle on which an audio operating device according to one embodiment of the present invention is mounted. FIG. 2 is a perspective view, seen from the front side, of the motorcycle shown in FIG. 1.

Referring to FIGS. 1 and 2, a front fork 5 for supporting a front wheel 4 is supported by a frame body 6, and a handlebar 8 is mounted on the front fork 5. A front fairing 7 for covering a display panel and a lighting device is provided on the front plane of the handlebar 8. A pair of headlamps 9 having multi-reflectors are contained in the front portion of the front fairing 7, and direction indicators 10 are mounted on both side surfaces of the fairing 7. A windproof screen 11 is provided on the upper portion of the front fairing 7, and an air inlet 12 is formed in the front fairing 7 at a position near the portion for mounting the windproof screen 11.

A fuel tank 13, a rider's seat 14, and a passenger's seat 15 are arranged in this order in the direction from the front fairing 7 to the rear side of the vehicular body. The passenger's seat 15 is formed integrally with the rider's seat 14, and has a backrest 16 and armrests 17. A rear box 18 is provided behind the backrest 16. A horizontally projecting supporting member 20 is provided on a bracket 19 (provided on the left side) for supporting the rear box 18, and an antenna 21 is provided on the supporting member 20. The antenna 21 can be also provided on the right side of the vehicular body. These antennas 21 are used as a radio antenna and a CB communication antenna.

An air cleaner 22 is provided in front of and under the fuel tank 13. A carburetor 23 is disposed behind the air cleaner 22. An intake manifold 25 extends from the carburetor 23 to an engine 24 disposed under the carburetor 23. The engine 24 is a horizontally-opposed six cylinder type in which three cylinders are arranged on the right and left sides of the vehicular body. An exhaust pipe 26 extends rearwardly from the engine 24, and is connected to a muffler 27. A radiator 74 is provided in front of the engine 24.

Side boxes 29 are arranged on the right and left sides of a rear wheel 28, and handle rail pipes 30 for a passenger are provided over the side boxes 29. A tail lamp 31 and a rear side direction indicator 32 are mounted on the rear portion of the vehicular body. In the figures, reference numeral 33 designates a rider's step, 34 is a passenger's step, 35 is a side cover, and 36 is a main stand. In addition, the step 34 is folded and the main stand 36 is raised.

Right and left handle-grips 1L and 1R are provided at the right and left leading ends of the handlebar 8. A switch unit 37 is provided on the handlebar 8 at a position adjacent to the left handle grip 1L, and an audio switch unit 38 is provided at a position adjacent to the upper surface of the switch unit 37. A stay 39 is erected in front of the switch unit 37, and a mirror 40 is mounted at the leading end of the stay 39. Reference numeral 41 designates a mirror provided near the right handle grip 1R, and 42 is a clutch lever.

Figure 3:
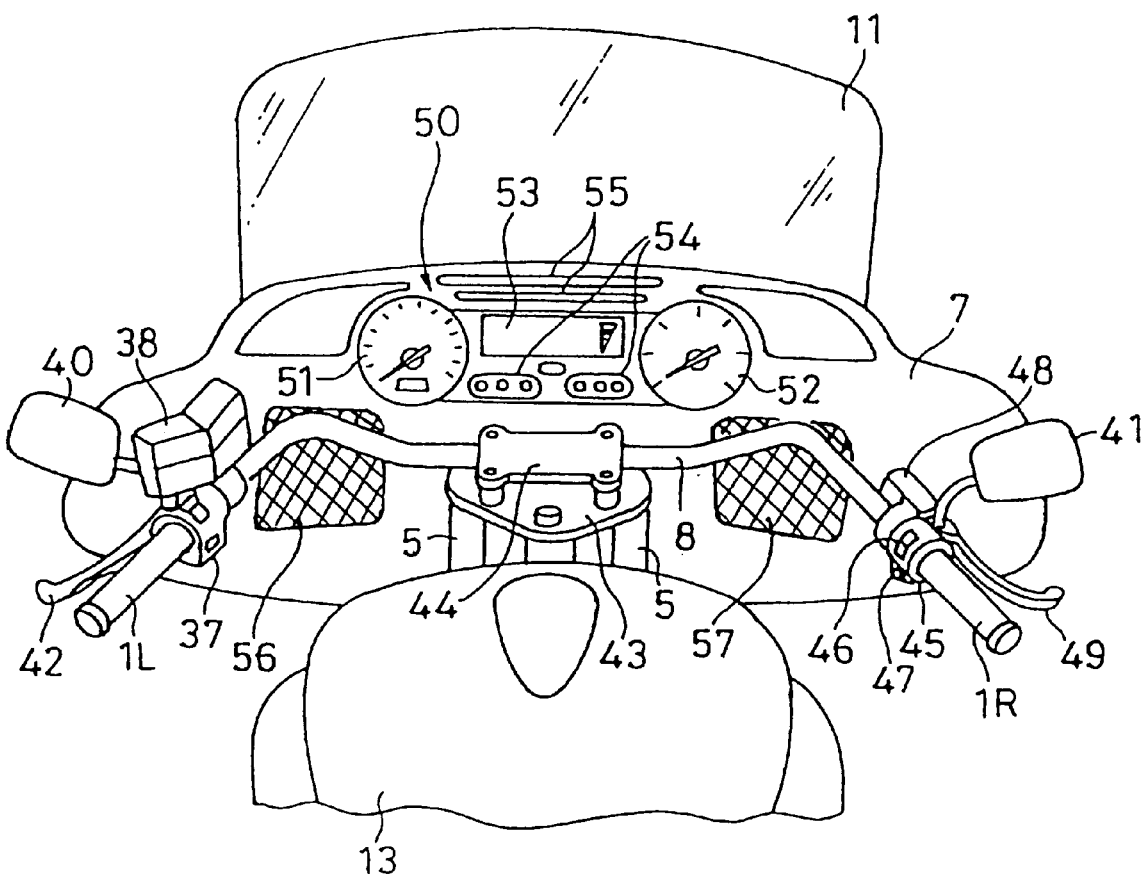
FIG. 3 is a detailed perspective view, seen from the rider's seat of the motorcycle, of a handlebar and a display panel.

FIG. 3 is a detailed perspective view, seen from the rider's seat, of the handlebar and the display panel. Referring to FIG. 3, the handlebar 8 is fixed, by a handlebar holding fixture 44, on a top bridge 43 connected to the upper portion of the front fork 5. A hazard switch 46 and a starter switch 47 are provided on a switch unit 45 at positions adjacent to the right handle grip 1R. A master cylinder 48 for operating a front brake is provided at a position adjacent to the switch unit 45. Reference numeral 49 designates a front brake lever. The switch unit 37 and the audio switch unit 38 provided at positions adjacent to the left handle grip 1L will be described in detail later.

A display panel 50 is provided inside the front fairing 7. A speedometer 51, a tachometer 52, a central display screen 53, and a lower display lamp portion 54 are arranged on the display panel 50. The configuration of the display panel 50 will be described in detail later.

Air discharge ports 55 communicated to the air inlet 12 are provided in the upper portion of the front fairing 7 for rectifying running wind led from the front side of the front fairing 7 along the inner surface of the windproof screen 11. Front speakers 56 and 57 are provided on the right and left sides of the lower portion of the front fairing 7.

Figure 4:
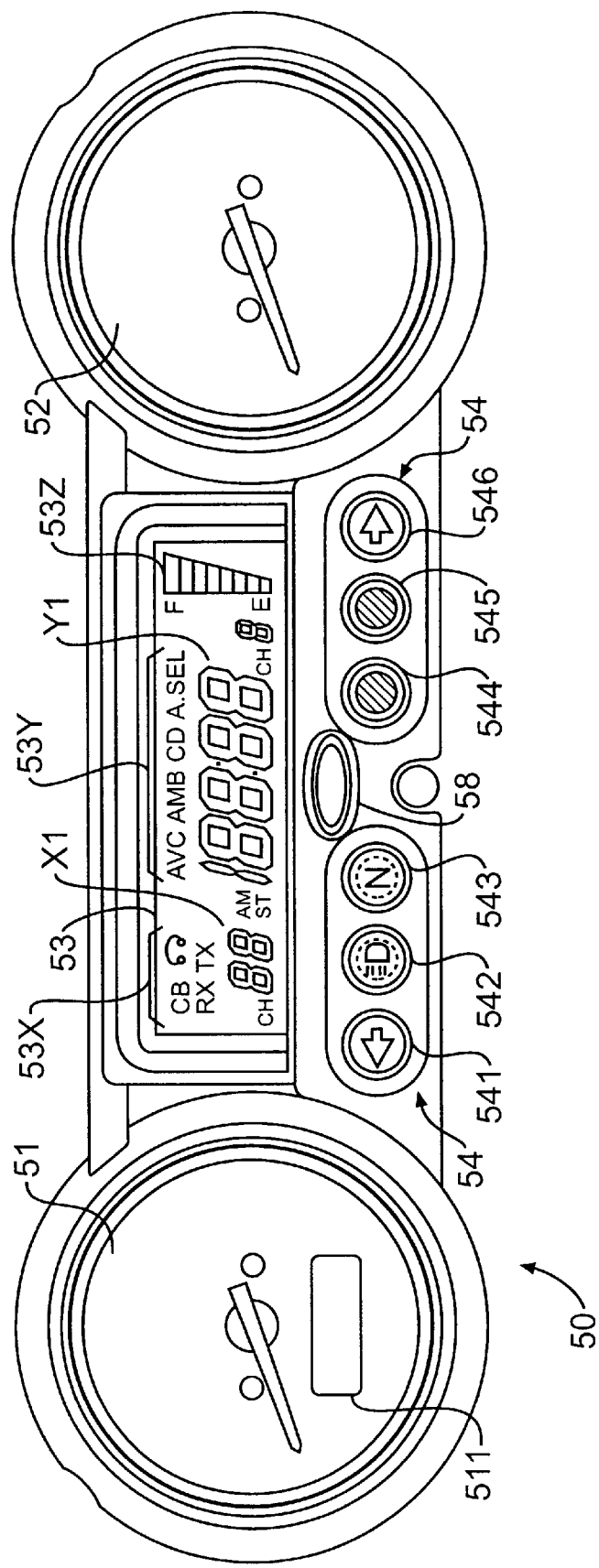
FIG. 4 is a view of the display panel of the motorcycle.

FIG. 4 is a view of the display panel of the motorcycle. A display portion 53X for CB communication, a display portion 53Y for radio, CD play, and CB communication, and a display portion 53Z for the amount of fuel are arranged in this order from left to right on a central display screen 53 of the display panel 50. Frequencies of radio and CB communication, and time are displayed on a screen X1, and a radio channel is displayed on a screen Y2.

The display lamp portion 54 is composed of six display lamps: a left direction indication display lamp 541, a high-beam display lamp 542, a neutral display lamp 543, an oil pressure display lamp 544, a water temperature display lamp 545, and a right direction indication display lamp 546. A running distance meter 511 capable of selectively displaying in digital form a trip meter and an odometer is provided on the speed meter 51. The trip meter can be reset by continuously pressing a selection button 58 for a specific time or more. The trip meter and odometer can be switched from each other by operating the selective button 58.

Figure 5:
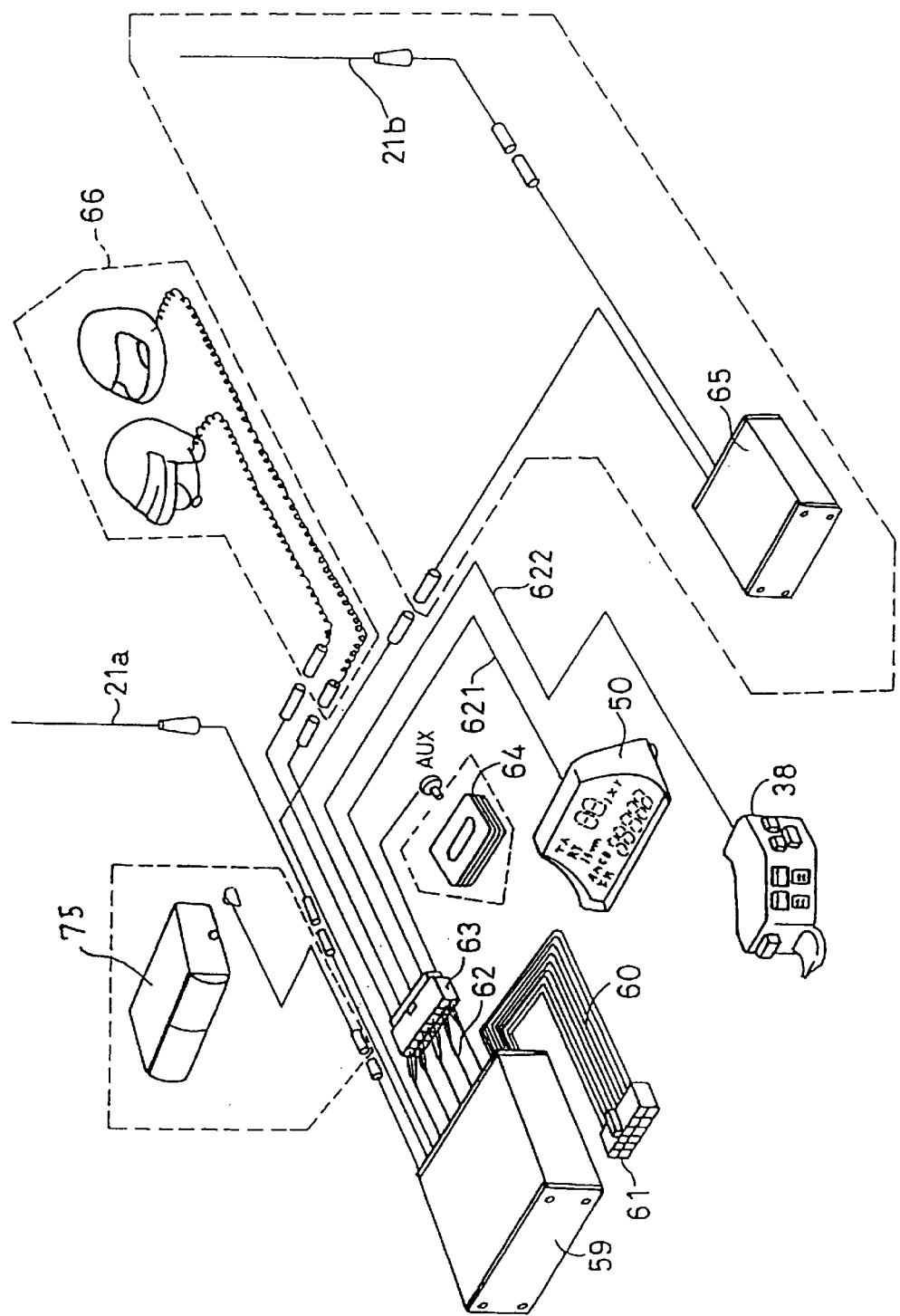
FIG. 5 is a flow diagram of audio equipment according to the present invention.

FIG. 5 is a flow diagram of the audio equipment mounted on a motorcycle according to this embodiment. A first connector 61 provided at the leading end of a first cable group 60 of an equipment main body 59 is connected to a wiring harness provided on the vehicular body side, and power is supplied and audio signals are outputted to the front speakers 56 and 57 through the connector 61. In addition to the front speakers, rear speakers may be provided near the passenger's seat 15.

A second connector 63 is connected to a second cable group 62 of the equipment main body 59. Of the second cable group 62, a set 621 of cables are connected to the display panel 50 through the second connector 63, and another set 622 of cables are connected to the audio switch unit 38 through the second connector 63.

A handy stereo (cassette, CD, etc.) device 64, a CB communication device 65, and a head set 66 can be additionally connected to the equipment main body 59 through the second connector 63. Not only the rider's head set 66 but also the passenger's heat set 66 can be provided. The head set 66 includes a speaker and a microphone assembled in a helmet. A rider can enter into conversation with a passenger through the head set 66, taking a communication with another station through the CB communication device 65, and enjoy audio through the speaker in the helmet.

A CD play device 75 can be connected to the equipment main body 59, as needed. A radio antenna 21a is connected to the equipment main body 59, and a CB communication antenna 21b is connected to the CB communication device 65. In this audio equipment, a large number of switches having been provided on the equipment main body 59 are provided on the audio switch unit 38 by arranging the shape of the audio switch unit 38 and the layout of the operating plane thereof Accordingly, it is possible to miniaturize the equipment main body 59 and hence to contain the equipment main body 59 in a small space of the motorcycle, for example, under the rider's seat 15.

Figure 6:
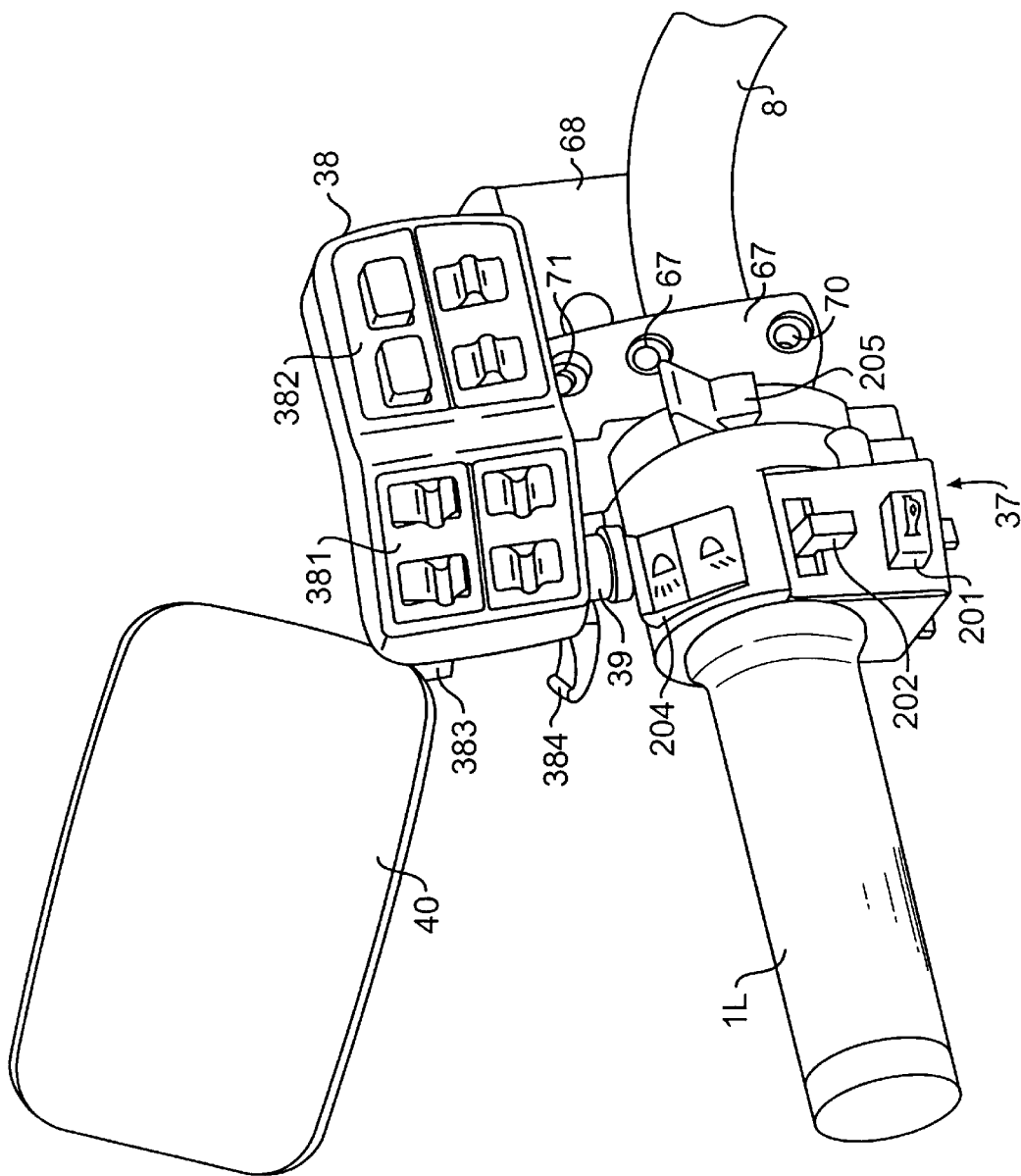
FIG. 6 is a perspective view of an audio operating device according to an embodiment of the present invention.

FIG. 6 is a perspective view of the audio switch unit 38 mounted on the handlebar 8. The audio switch unit 38 is fixed on the handlebar 8 via a block 67. A master cylinder 68 for operating a hydraulic clutch is provided in front of the audio switch unit 38 in the longitudinal direction of the vehicle body. The master cylinder 68 is also fixed to the handlebar 8 by means of the block 67. A housing of the master cylinder 68 can be formed integrally with the block 67. The block 67 is divided into two parts. The two parts of the block 67 are fixed to each other by bolts 69 and 70 with the handlebar 8 held therebetween. The stay 39 for supporting the mirror 40 is also mounted on the block 67. A bolt 71 is used for fixing the block 67 to the audio switch unit 38.

The switch unit 37 is provided on the handlebar 8 at a position adjacent to the handle grip 1L. A horn switch 201, a blinker switch 202, and a high-beam/low-beam selecting switch 204 are provided on the switch unit 37. A choke lever 205 is provided at a position adjacent to the vehicular central side of the switch unit 37.

The audio switch unit 38 has a first operating plane 381 which is tilted to the handle grip 1L side for allowing a rider to easily operate switches on the first operating plane 381 mainly with his left thumb during running of the motorcycle. The audio switch unit 38 also has a second operating plane 382 which is tilted to the first operating plane 381 in such a manner as to be opposed to a rider sitting on the rider's seat 14. In addition, switches are arranged on side surfaces of the audio switch unit 38 (which will be described in detail later).

Figure 7:
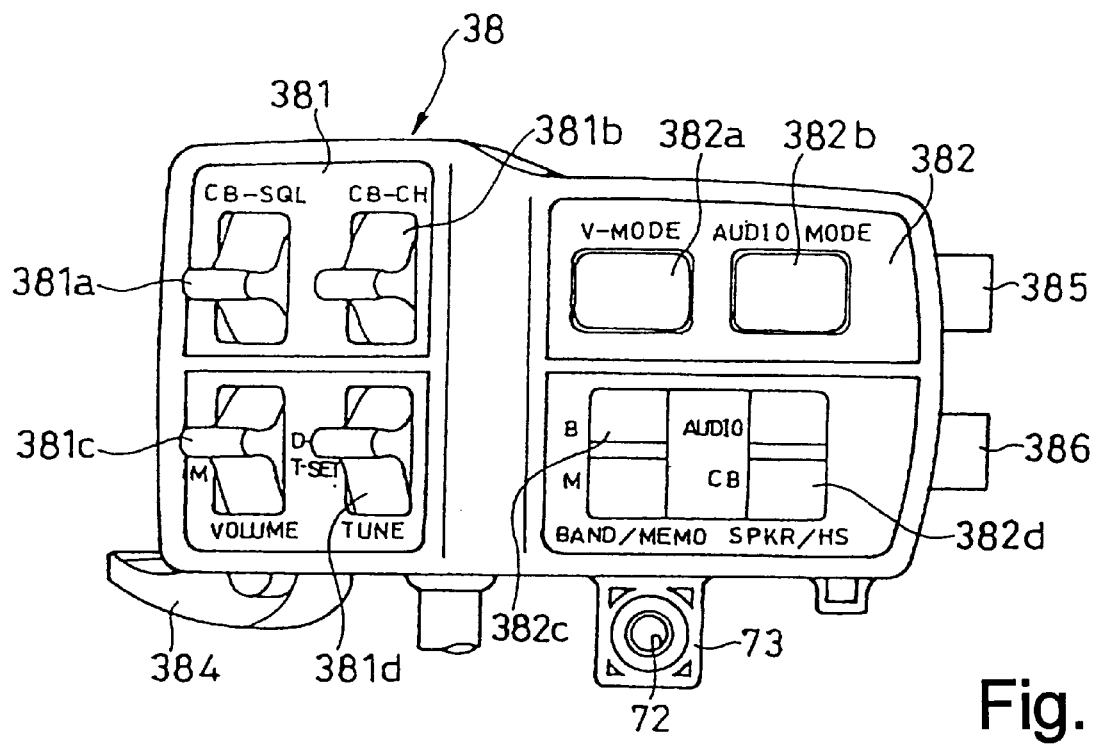
FIG. 7 is a front view of the audio operating device shown in FIG. 1.
Figure 8:
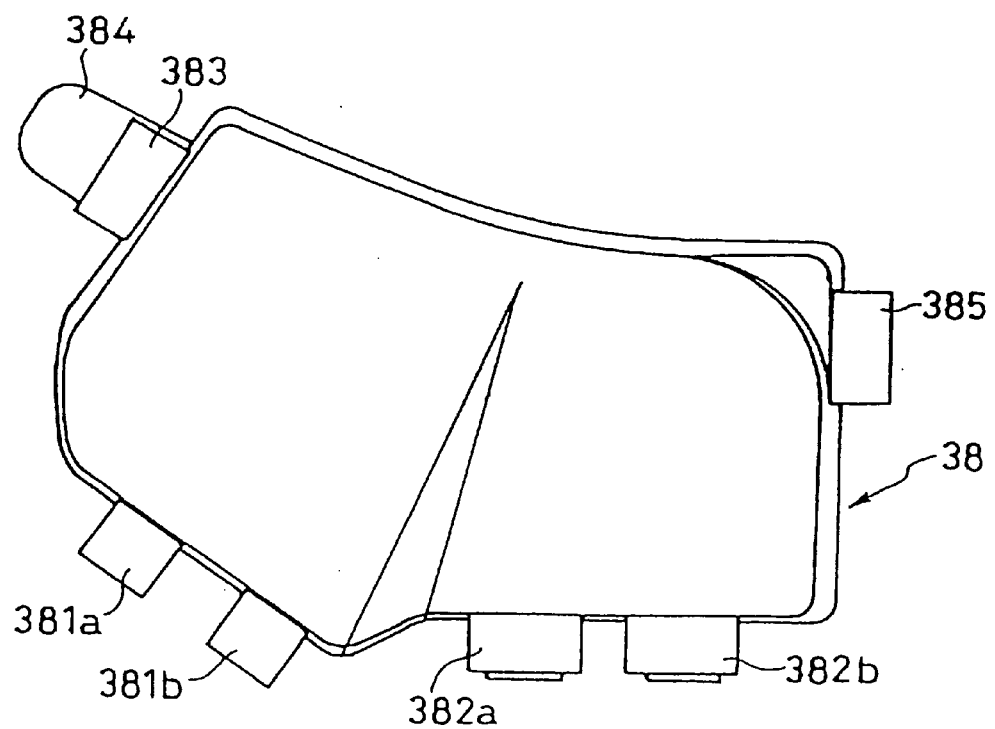
FIG. 8 is plan view of the audio operating device shown in FIG. 1.
Figure 9:
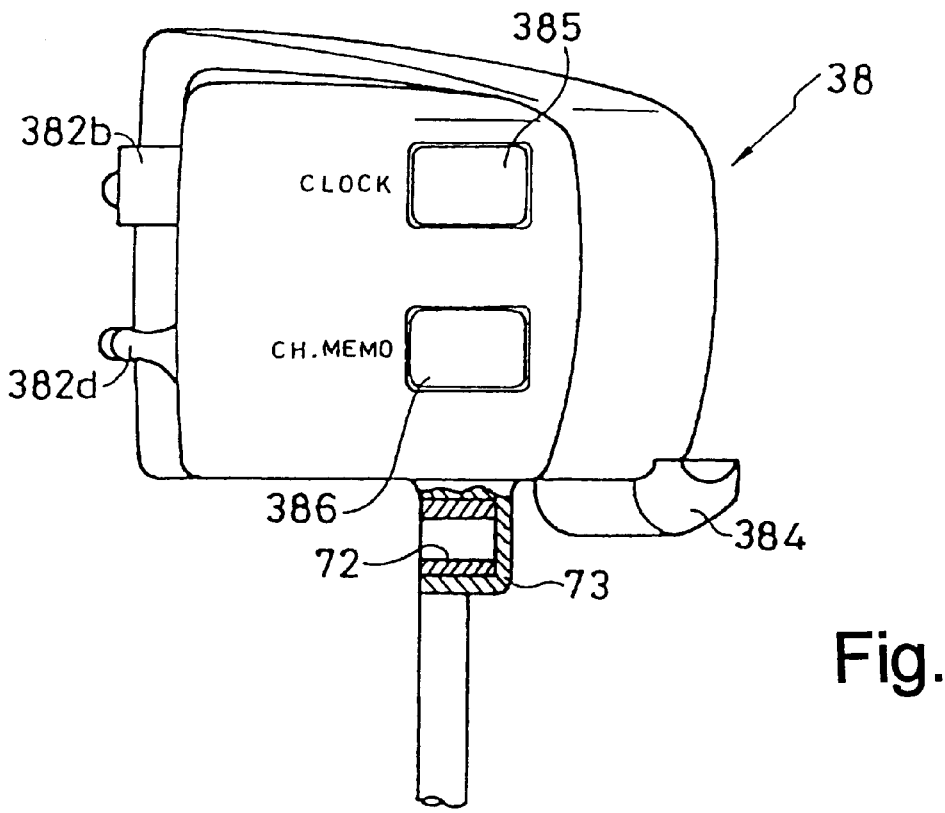
FIG. 9 is a right side view of the audio operating device shown in FIG. 1.
Figure 10:
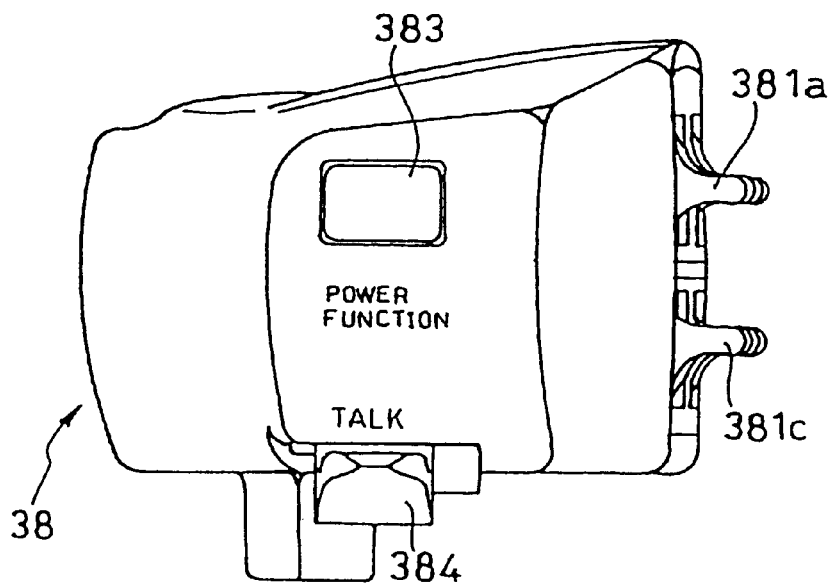
FIG. 10 is a left side view of the audio operating device shown in FIG. 1.

Switches provided on the audio switch unit 38 will be described below. FIG. 7 is a front view of the audio switch unit 38, and FIG. 8 is a plan view thereof FIG. 9 is a right side view thereof; and FIG. 10 is a left side view thereof Referring to FIGS. 7 to 10, a squelch selecting switch 381a for CB communication, a channel selecting switch 381b for CB communication, a sound volume adjusting switch 381c, and a tuning switch 381d are provided on the first operating plane 381 of the audio switch unit 38. A sound volume mode selecting switch 382a, a sound quality selecting switch 382b, a receiving band selecting/presetting switch 382c, and an audio signal destination selecting switch 382d are provided on the second operating plane 382.

A power supply/function switch 383 and a talk knob 384 for CB communication are provided on the left side surface of the audio switch unit 38. A display selecting switch 385 and a channel pre-setting switch 386 are provided on the right side surface of the audio switch unit 38. A projection 73 having a threaded hole 72 in which a bolt 71 for fixing the block 67 is to be screwed is formed on the bottom surface of the audio switch unit 38.

The functions of the above-described switches will be described below. The power supply/function switch 383 has the ON/OFF function of the power supply serving as the switching function for the radio, CB communication device, CD play device, and handy stereo device. The radio, CB communication device, CD play device, and handy stereo device can be selected not only singly but also in combination.

The squelch selecting switch 381a has a CB squelch level tap-up/tap-down function and a CB squelch level fast-forward tap-up/tap-down function. The channel selecting switch 381b has a CB channel tap-up/tap-down function, and a CB channel fast-forward tap-up/tap-down function.

The sound volume mode selecting switch 382a has the function of selecting which sound volume is adjustable among CB communication, intercom (communication between the rider and passenger), speaker, and head set. The sound quality selecting switch 382b has the function of selecting the sound quality of audio, for example, ON/OFF of bass, treble, and ambience or ON/OFF of roger beep sound. The display selecting switch 385 has the function of selecting either the audio preferential display or the time preferential display on the display screen 53 and a function of selecting the time adjustment mode.

The sound volume adjusting switch 381c has the function of performing tap-up/tap-down of the setting value of the sound volume of the radio, CB communication device, CD play device, or handy stereo device selected by the power supply/function switch 383, and the function of performing the fast-forward tap-up/tap-down of the setting value. The sound volume adjusting switch 381c also has the function of performing tap-up/tap-down of the sound volume setting value of the CB communication, intercom, speaker, or head set selected by the sound volume mode selecting switch 382a, and has the function of performing fastforward tap-up/tap-down of the setting value. The sound volume adjusting switch 381c also has a function of adjusting a time point in the time adjusting mode.

The tuning switch 381d has a function of performing tap-up/tap-down of the frequency and seek upon use of the radio, feeding and rewinding music upon CD playing, and performing CD exchange. The receiving band selecting/presetting switch 382c has the function of selecting either AM or FM of the radio and reading the pre-setting value thereof The audio signal output destination selecting switch 382d has the function of selecting to which of the speakers 56 and 57 and the head set 66 an audio signal is outputted. The channel pre-setting switch 386 has the function of pre-setting the radio channel, and the function of pre-setting the AM channel or FM channel selected by the receiving band selecting/presetting switch 382c.

Figure 11:
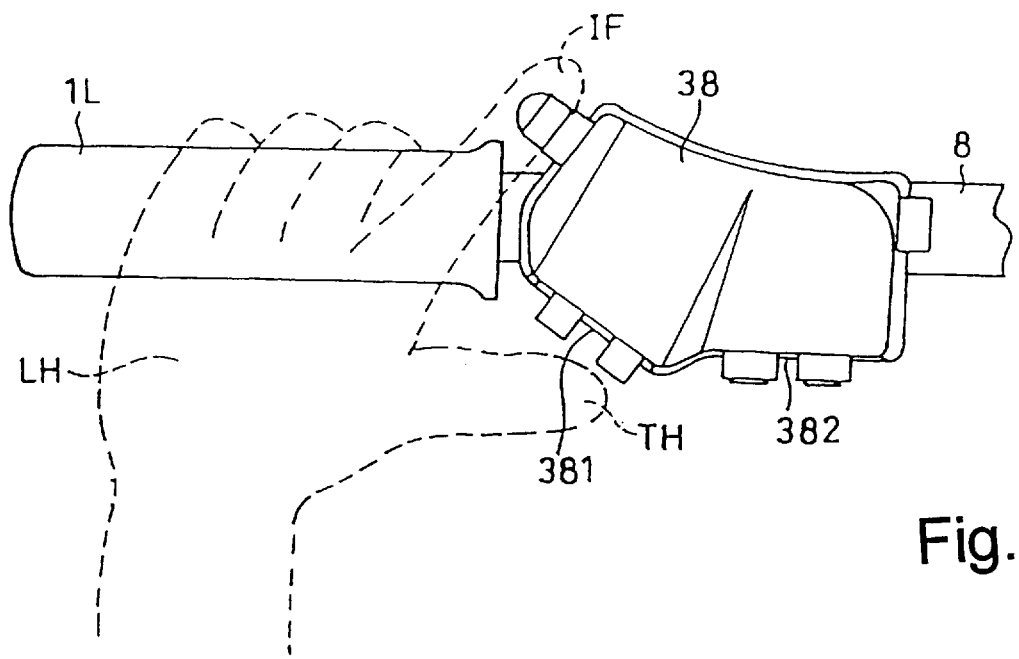
FIG. 11 is a view of the audio operating device in relation to a rider's hand on the handle grip.
Figure 12:
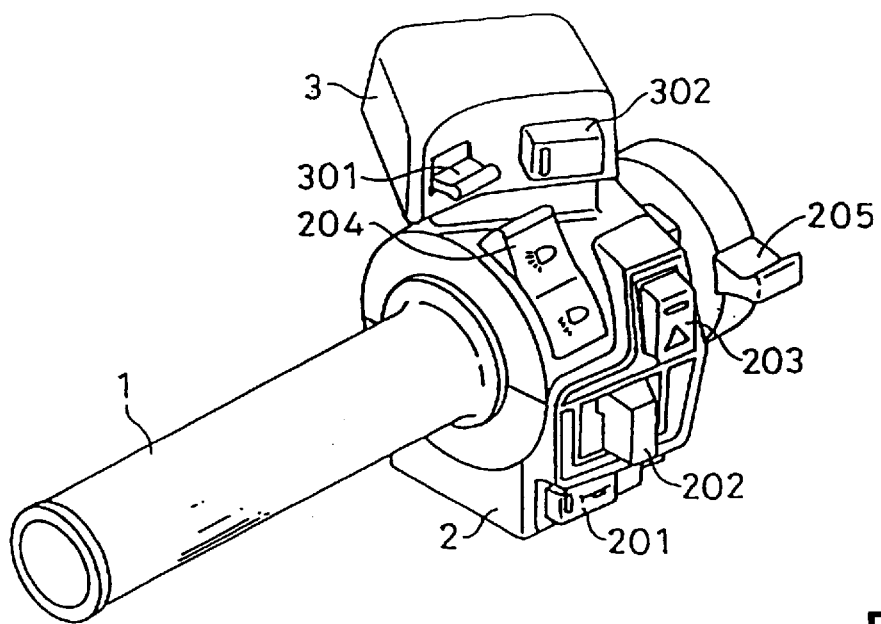
FIG. 12 is a perspective view of a conventional audio switch unit.

FIG. 11 is a plan view showing an operational state of the audio switch unit 38. The rider operates the switches on the first operating plane 381 and the left side surface of the audio switch unit 38 with his left hand LH. In particular, the disposition and direction of the first operating plane 381 are set in such a manner as to allow the index finger IF to easily operate the power supply/function switch 383 and the talk knob 384 on the left side surface of the audio switch unit 38, and to allow the thumb TH to easily operate the switches on the first operating plane 381.

The disposition and direction of the second operating plane 382 is set in such a manner as to allow the rider to easily operate the switches arranged on the second operating plane 382 and the right side surface of the audio switch unit 38 with his right hand. The switches which are frequently adjusted, such as the sound volume switch and the tuning switch, are arranged on the first operating plane 381, whereby the rider can operate the switches with his left hand while holding the handle grip 1L. Those switches which are not generally frequently operated, and which operation may be delayed until the vehicle is stopped, such as the pre-setting switch and the function selecting switches, are arranged on the second operating plane 382.

As is apparent from the above description, the operating plane of the audio switch unit provided on the handlebar at a position adjacent to the handle grip is divided into a first operating plane which is easily operated by the rider's left hand, and a second operating plane which is easily operated by the rider's right hand. As a result, it is possible to arrange a large number of switches necessary for audio operation on the first and second operating planes, and hence to arrange a large number of functions selected from the viewpoint of the rider on the motorcycle.

Further, since high frequency use switches are arranged on the first operating plane, a rider can easily operate the switches during running of the motorcycle, and since low frequency use switches are arranged on the second operating plane, the rider can perform initial setting of the audio switch unit during stoppage of the motorcycle. In particular, since the first and second operating planes are tilted at predetermined angles to one another, and are thereby clearly distinguished from each other, it is possible to eliminate confusion among the locations of the various switches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An audio operating device for mounting on a handlebar of a vehicle, the handlebar extending generally outward from a body of the vehicle and having a handle grip at an end of the handlebar, the device comprising:
    a body, the comprising:
    a first operating plane;
    a second operating plane, the second operating plane being disposed proximate to the first operating plane;
    an upper surface extending above the first and second operating planes;
    a lower surface extending below the first and second operating planes;
    a right side surface; and
    a left side surface, the two operating planes being disposed at an angle to one another so that when the body is mounted to the handlebar, the first operating plane is tilted away from a center portion of the handlebar with respect to the second operating plane, and the first operating plane is disposed between the handle grip and the second operating plane;
    a first plurality of switches disposed in the first operating plane; and
    a second plurality of switches disposed in the second operating plane.

2. The device of claim 1, wherein the first plurality of switches includes at least two of a volume switch, a squelch selecting switch, a CB channel selection switch, and a tuning switch.

3. The device of claim 1, wherein the second plurality of switches includes at least two of a sound volume mode selecting switch, a sound quality selecting switch, an audio signal destination selecting switch, and a receiving band presetting switch.

4. The device of claim 1, wherein the right side of the device includes at least one of a display switch, and a channel presetting switch.

5. The device of claim 4, wherein the right side surface is generally perpendicular to the second operating plane.

6. The device of claim 1, wherein the left side surface of the device includes at least one of a power supply switch, and a talk knob to enable transmission on a CB radio.

7. The device of claim 6, wherein the left side surface is generally perpendicular to the first operating plane.

8. The device of claim 1, further comprising a projection extending downwardly from the lower surface of the body, the projection having a first aperture for receiving a portion of the handlebar, and a second aperture for receiving a securing member for securing the projection to the handlebar.

9. The device of claim 8, wherein the first aperture is substantially cylindrical and has an axis, the axis being substantially aligned with the second operating plane.

10. The device of claim 8, wherein the projection is connected to the body to support the body a distance above the handlebar such that the second operating plane is closer to the center portion of the handlebar than is the first operating plane.

11. The device of claim 1, wherein when the body is mounted on the handlebar, a rider can operate the first plurality of switches with a left thumb while maintaining a grip on the handle grip with a left hand.

12. The device of claim 11, wherein when the body is mounted on the handlebar, a rider can operate a switch on the left side surface with a left index finger while maintaining a grip on the handle grip with the left hand.

13. The device of claim 1, wherein the body is comprised of first and second substantially parallelepipedal sections, the first operating plane being a front surface of the first section, and the second operating plane being a front surface of the second section.

* * * * *